US009274743B2

(12) United States Patent
Jadhav

(10) Patent No.: US 9,274,743 B2
(45) Date of Patent: Mar. 1, 2016

(54) DEDICATED VOICE/AUDIO PROCESSING THROUGH A GRAPHICS PROCESSING UNIT (GPU) OF A DATA PROCESSING DEVICE

(71) Applicant: NVIDIA Corporation, Santa Clara, CA (US)

(72) Inventor: Mahesh Sambhaji Jadhav, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 60 days.

(21) Appl. No.: 13/956,433

(22) Filed: Aug. 1, 2013

(65) Prior Publication Data

US 2015/0035842 A1    Feb. 5, 2015

(51) Int. Cl.
| | |
|---|---|
| G10L 21/00 | (2013.01) |
| G06T 1/20 | (2006.01) |
| G06F 3/16 | (2006.01) |
| G09G 5/00 | (2006.01) |
| G09G 5/36 | (2006.01) |
| G06T 1/60 | (2006.01) |

(52) U.S. Cl.
CPC . *G06F 3/162* (2013.01); *G06T 1/20* (2013.01); *G06T 1/60* (2013.01); *G09G 5/006* (2013.01); *G09G 5/363* (2013.01); *G10L 21/00* (2013.01); *G09G 2360/10* (2013.01)

(58) Field of Classification Search
CPC .... G10L 21/00; G09G 5/363; G09G 2352/00; G06T 1/60
USPC .................. 345/501, 505, 520, 530
See application file for complete search history.

(56) References Cited

U.S. PATENT DOCUMENTS

| | | | |
|---|---|---|---|
| 4,716,562 A * | 12/1987 | Carse et al. | 370/294 |
| 6,453,281 B1 * | 9/2002 | Walters et al. | 704/200 |
| 6,924,846 B2 | 8/2005 | Ohba et al. | |
| 7,292,242 B1 * | 11/2007 | Wittenbrink et al. | 345/421 |
| 7,782,325 B2 * | 8/2010 | Gonzalez et al. | 345/505 |
| 8,174,529 B2 | 5/2012 | Iwaki et al. | |
| 8,289,333 B2 | 10/2012 | Schreyer et al. | |
| 8,442,829 B2 | 5/2013 | Chen | |
| 2006/0247918 A1 | 11/2006 | Schmidt et al. | |
| 2007/0293315 A1 * | 12/2007 | Mizuta | 463/36 |
| 2011/0087345 A1 | 4/2011 | Chan et al. | |
| 2011/0230232 A1 * | 9/2011 | Tran | 455/556.1 |
| 2012/0001930 A1 * | 1/2012 | Iwaki et al. | 345/547 |
| 2012/0203776 A1 * | 8/2012 | Nissan | 707/728 |
| 2013/0187947 A1 | 7/2013 | Barringer et al. | |
| 2014/0098117 A1 * | 4/2014 | Goel et al. | 345/522 |

OTHER PUBLICATIONS http://www-sop.inria.fr/reves/projects/GPUAudio/, Sep. 2004.
Misic, M.J, et al., "Evolution and trends in GPU computing", MIPRO, 2012 Proceedings of the 35th International Convention, May 21-25, 2012, 289-294.

* cited by examiner

*Primary Examiner* — Joni Richer
(74) *Attorney, Agent, or Firm* — Zilka-Kotab, PC

(57) ABSTRACT

A method includes providing an input port and/or an output port directly interfaced with a Graphics Processing Unit (GPU) of a data processing device further including a Central Processing Unit (CPU) to enable a corresponding reception of input data and/or rendering of output data therethrough. The method also includes implementing a voice/audio processing engine in the data processing device. Further, the method includes performing voice/audio related processing of the input data received through the input port and/or voice/audio related processing of data in the data processing device to realize the output data based on executing the voice/audio processing engine solely through the GPU.

17 Claims, 7 Drawing Sheets

DEDICATED VOICE/AUDIO PROCESSING THROUGH A GRAPHICS PROCESSING UNIT (GPU) OF A DATA PROCESSING DEVICE

FIELD OF TECHNOLOGY

This disclosure relates generally to voice/audio processing and, more particularly, to dedicated voice/audio processing through a Graphics Processing Unit (GPU) of a data processing device.

BACKGROUND

A data processing device (e.g., a personal computer, a laptop computer, a notebook, a netbook, an ultrabook, a mobile device such as a mobile phone) may be limited in processing capability by a processor (e.g., Central Processing Unit (CPU)) thereof. While the processor may be upgraded, execution of a voice/audio processing algorithm through the upgraded processor may, again, be severely limited by factors such as current tasks being handled by the upgraded processor and/or other processes executing in the background. When the data processing device is employed in a scenario demanding quick processing (e.g., the data processing device being utilized as a Global Positioning System (GPS) device for obtaining driving directions based on a voice/audio input) by a user thereof, the aforementioned limitation(s) may contribute to frustration on part of the user with regard to the utility of the data processing device.

SUMMARY

Disclosed are a method, a device and/or a system of dedicated voice/audio processing through a Graphics Processing Unit (GPU) of a data processing device.

In one aspect, a method includes providing an input port and/or an output port directly interfaced with a GPU of a data processing device further including a Central Processing Unit (CPU) to enable a corresponding reception of input data and/or rendering of output data therethrough. The method also includes implementing a voice/audio processing engine in the data processing device. Further, the method includes performing voice/audio related processing of the input data received through the input port and/or voice/audio related processing of data in the data processing device to realize the output data based on executing the voice/audio processing engine solely through the GPU.

In another aspect, a data processing device includes a system memory, a CPU communicatively coupled to the system memory, a GPU memory, and a GPU communicatively coupled to the GPU memory. The data processing device also includes an input port and/or an output port directly interfaced with the GPU to enable a corresponding reception of input data and/or rendering of output data therethrough. The GPU memory includes a voice/audio processing engine configured to execute solely on the GPU to perform voice/audio related processing of the input data received through the input port and/or voice/audio related processing of data in the data processing device to realize the output data.

In yet another aspect, a non-transitory medium, readable through a data processing device including a CPU and a GPU and including instructions embodied therein that are executable through the data processing device, is disclosed. The non-transitory medium includes instructions to provide an input port and/or an output port directly interfaced with the GPU to enable a corresponding reception of input data and/or rendering of output data therethrough. The non-transitory medium also includes instructions to implement a voice/audio processing engine in the data processing device. Further, the non-transitory medium includes instructions to perform voice/audio related processing of the input data received through the input port and/or voice/audio related processing of data in the data processing device to realize the output data based on executing the voice/audio processing engine solely through the GPU.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of dedicated voice/audio processing through a Graphics Processing Unit (GPU) of a data processing device. Although the present embodiments have been described with reference to specific example embodiments, it will be evident that various modifications and changes may be made to these embodiments without departing from the broader spirit and scope of the various embodiments.

Figure 1:
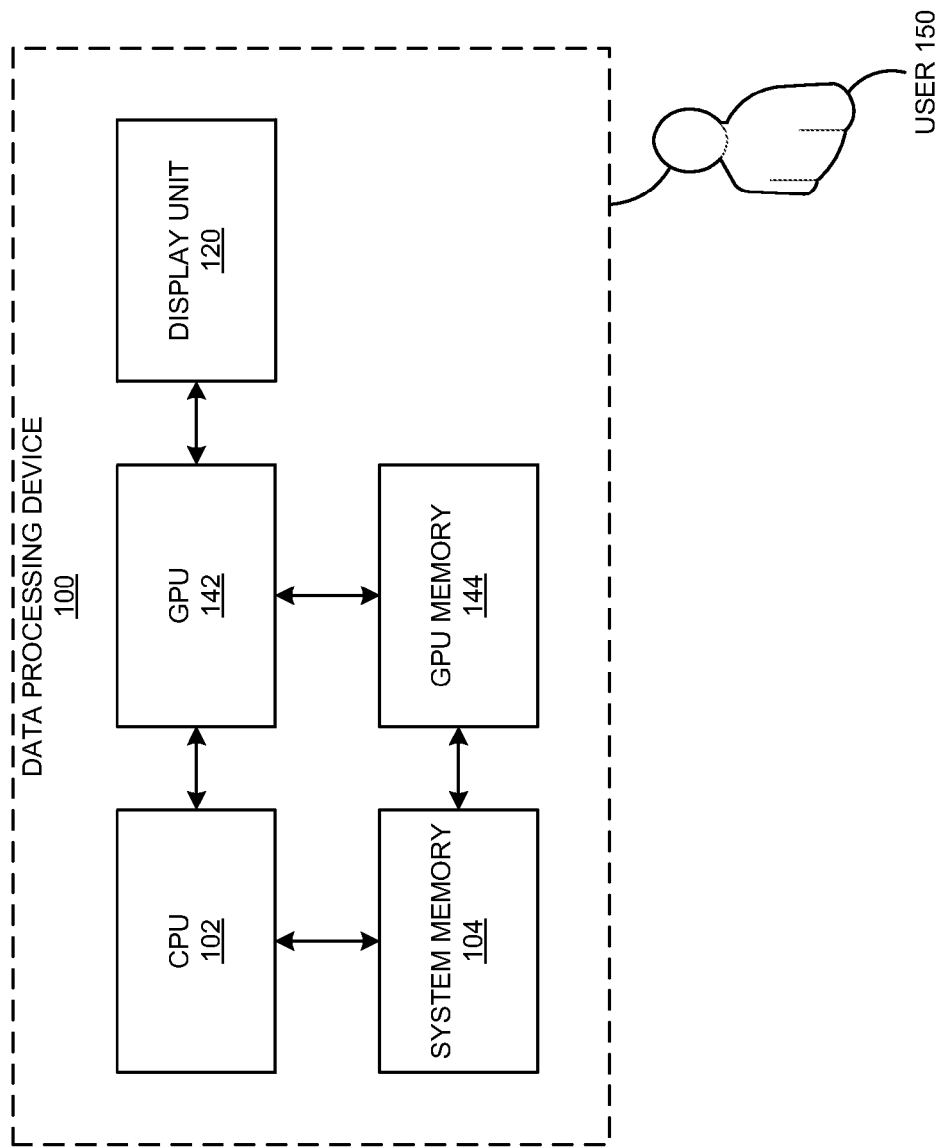
FIG. 1 is a schematic view of a data processing device, according to one or more embodiments.

FIG. 1 shows a data processing device 100, according to one or more embodiments. An example data processing device 100 may include but is not limited to a desktop computer, a laptop computer, a notebook computer, a netbook, an ultrabook, a tablet, a speech-generating device and a mobile device such as a mobile phone. In one or more embodiments, data processing device 100 may include a Central Processing Unit (CPU) 102 communicatively coupled to a system memory 104; CPU 102 may be configured to address storage locations in system memory 104. In one or more embodiments, system memory 104 may include a volatile memory (e.g., Random Access Memory (RAM)) and/or a non-volatile memory (e.g., Read-Only Memory (ROM), hard disk).

Similarly, in one or more embodiments, data processing device 100 may include a Graphics Processing Unit (GPU) 142 communicatively coupled to a GPU memory 144 associated therewith; again, GPU 142 may be configured to address storage locations in GPU memory 144, and GPU memory 144 may include a volatile memory and/or a non-volatile memory. GPUs are well known to one skilled in the art; therefore, detailed discussion associated therewith has been skipped for the sake of brevity and clarity. In one or more embodiments, data processing device 100 may include a display unit 120 (e.g., a Cathode Ray Tube (CRT), a Liquid Crystal Display (LCD)) to have display data processed through GPU 142 rendered thereon. FIG. 1 shows display unit 120 as being interfaced with GPU 142.

Figure 2:
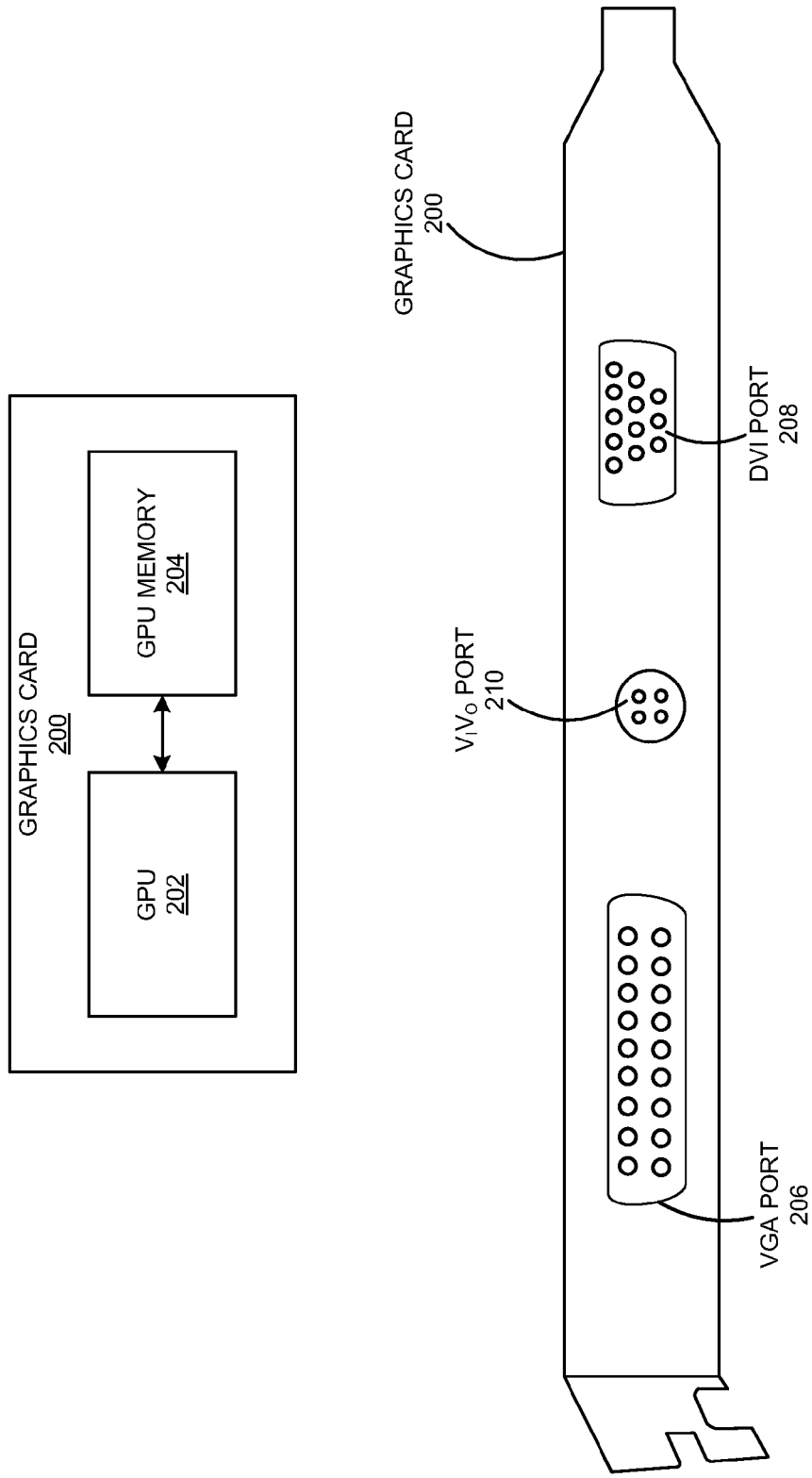
FIG. 2 is a schematic and an illustrative view of a graphics card including a Graphics Processing Unit (GPU) in a typical implementation thereof.

FIG. 2 shows a graphics card 200 including a GPU 202 (analogous to GPU 142) in a typical implementation thereof. Graphics card 200 may also include a GPU memory 204 (analogous to GPU memory 144) to store data for processing through GPU 202. FIG. 2 also shows a front view of graphics card 200 including a Video Graphics Array (VGA) port 206 and a Digital Visual Interface (DVI) port 208. The aforementioned ports may enable coupling of a display unit (e.g., display unit 120) thereto configured to have an output of video/graphics processing through GPU 202 rendered thereon. In addition, graphics card 200 may include a Video In/Video Out (ViVo) port 210 to enable coupling of devices such as a video recorder, camera and a television thereto. It should be noted that VGA port 206, DVI port 208 and ViVo port 210 are merely shown for example purposes; other video ports may also be available on graphics card 200 either in addition to the aforementioned ports or instead of one or more of the aforementioned ports.

During video processing through data processing device 100, CPU 102 may enable loading of data onto GPU memory 204 and/or instruct GPU 202 appropriately such that GPU 202 utilizes system memory 104 and/or GPU memory 204 to process said data for rendering thereof on the display unit discussed above. Thus, GPU 202 may serve as a dedicated graphics/video processing engine. Exemplary embodiments to be discussed below provide for a dedicated voice/audio processing engine through a GPU. Also, it should be noted that the components/elements/capabilities of the GPU facilitating the voice/audio processing may be provided in addition to those facilitating the graphics/video processing discussed above.

Figure 3:
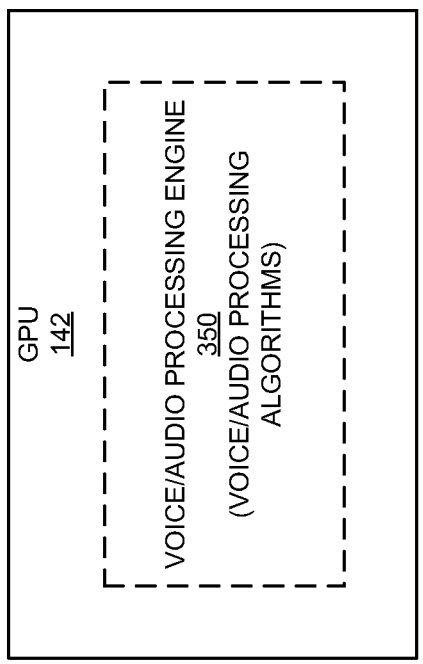
FIG. 3 is a schematic view of a GPU of the data processing device of FIG. 1 having a voice/audio processing engine implemented therein, according to one or more embodiments.
Figure 4:
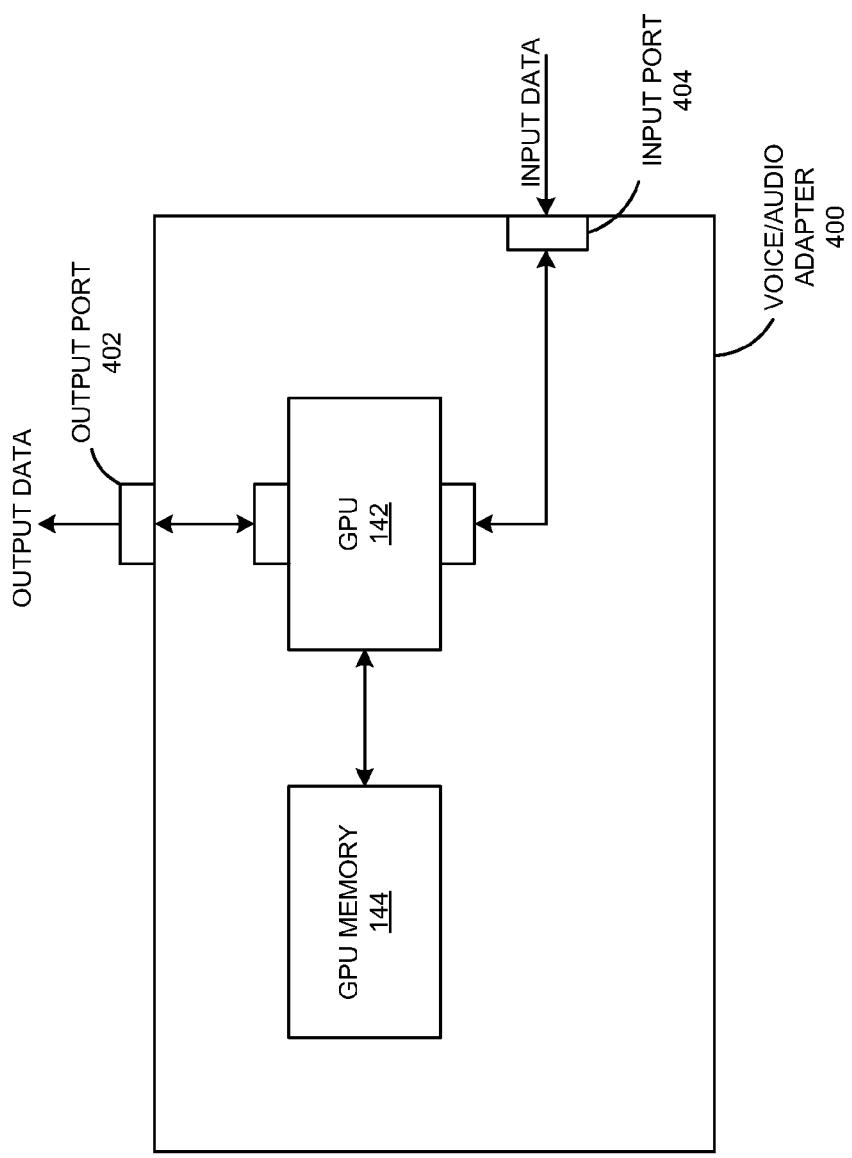
FIG. 4 is a schematic view of a voice/audio adapter configured to include the GPU and a GPU memory of the data processing device of FIG. 1 therein, according to one or more embodiments.

FIG. 3 shows GPU 142 having a voice/audio processing engine 350 (a set of engines executing instructions and/or voice/audio processing algorithms therein) implemented therein, according to one or more embodiments. In one or more embodiments, voice/audio processing engine 350 may provide for functionalities associated with utilizing GPU 142 as a dedicated voice/audio processing component of data processing device 100. FIG. 4 shows a voice/audio adapter 400 configured to include GPU 142 and GPU memory 144 therein, according to one or more embodiments. Here, voice/audio adapter 400 may be analogous to graphics card 200; in other words, voice/audio adapter 400 may serve as an expansion card to data processing device 100 to enhance voice/audio processing capabilities thereof.

In one or more embodiments, voice/audio adapter 400 may include an output port 402 configured to be interfaced with a voice/audio output device (not shown in FIG. 4) of data processing device 100 such as an electroacoustic transducer (e.g., an audio speaker) and a pair of headphones/earphones; alternately output port 402 may also be interfaced with a non-voice/audio related output device such as a display unit (e.g., in the case of an audio to text conversion to be displayed on a screen of the display unit).

In one or more embodiments, voice/audio adapter 400 may further include an input port 404 configured to be interfaced with a voice/audio input device (not shown in FIG. 4) of data processing device 100 such as a microphone. In one or more embodiments, input port 404 may also be interfaced with a non-voice/audio input device such as a keyboard (e.g., to input text into data processing device 100 to be converted into an audio format). While FIG. 4 shows voice/audio adapter 400 as including both output port 402 and input port 404, it should be noted that merely one of the aforementioned ports may be part of an example implementation thereof. Further, it should be noted that a same port of voice/audio adapter 400 may serve as output port 402 and input port 404. In other words, an Input/Output (I/O) port (not shown) may be provided on voice/audio adapter 400.

Figure 5:
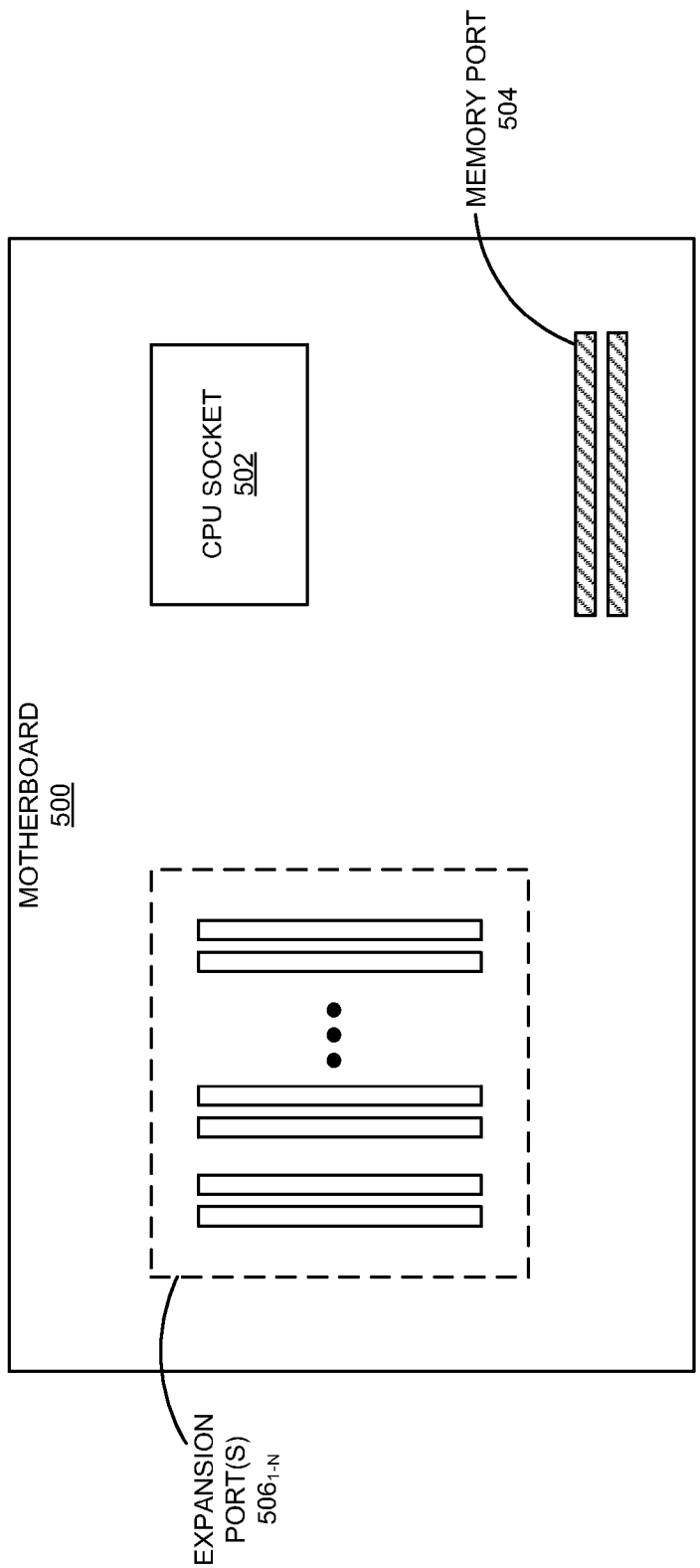
FIG. 5 is a schematic view of a motherboard of the data processing device of FIG. 1.

FIG. 5 shows a motherboard 500 of data processing device 100, according to one or more embodiments. In one or more embodiments, motherboard 500 may be a Printed Circuit Board (PCB) on which components critical to functioning of data processing device 100 are arranged; in other words, motherboard 500 may be the core assembly unit of data processing device 100. FIG. 5 shows motherboard 500 as including a CPU socket 502 configured to receive CPU 102 therein.

In one or more embodiments, motherboard 500 may also include a memory port 504 configured to receive system memory 104 therein. For example, a Random Access Memory (RAM) (example system memory 104) may be inserted into memory port 504. Components of motherboard 500 are well known to one of ordinary skill in the art; therefore, detailed discussion associated therewith has been skipped for the sake of convenience and brevity. In one or more embodiments, motherboard 500 may include one or more expansion port(s) $506_{1-N}$, at least one of which is configured to receive voice/audio adapter 400 including GPU 142. The one or more expansion port(s) $506_{1-N}$ may, for example, be based on the Peripheral Component Interconnect Express (PCIe) standard. Other standards are within the scope of the exemplary embodiments discussed herein.

Figure 6:
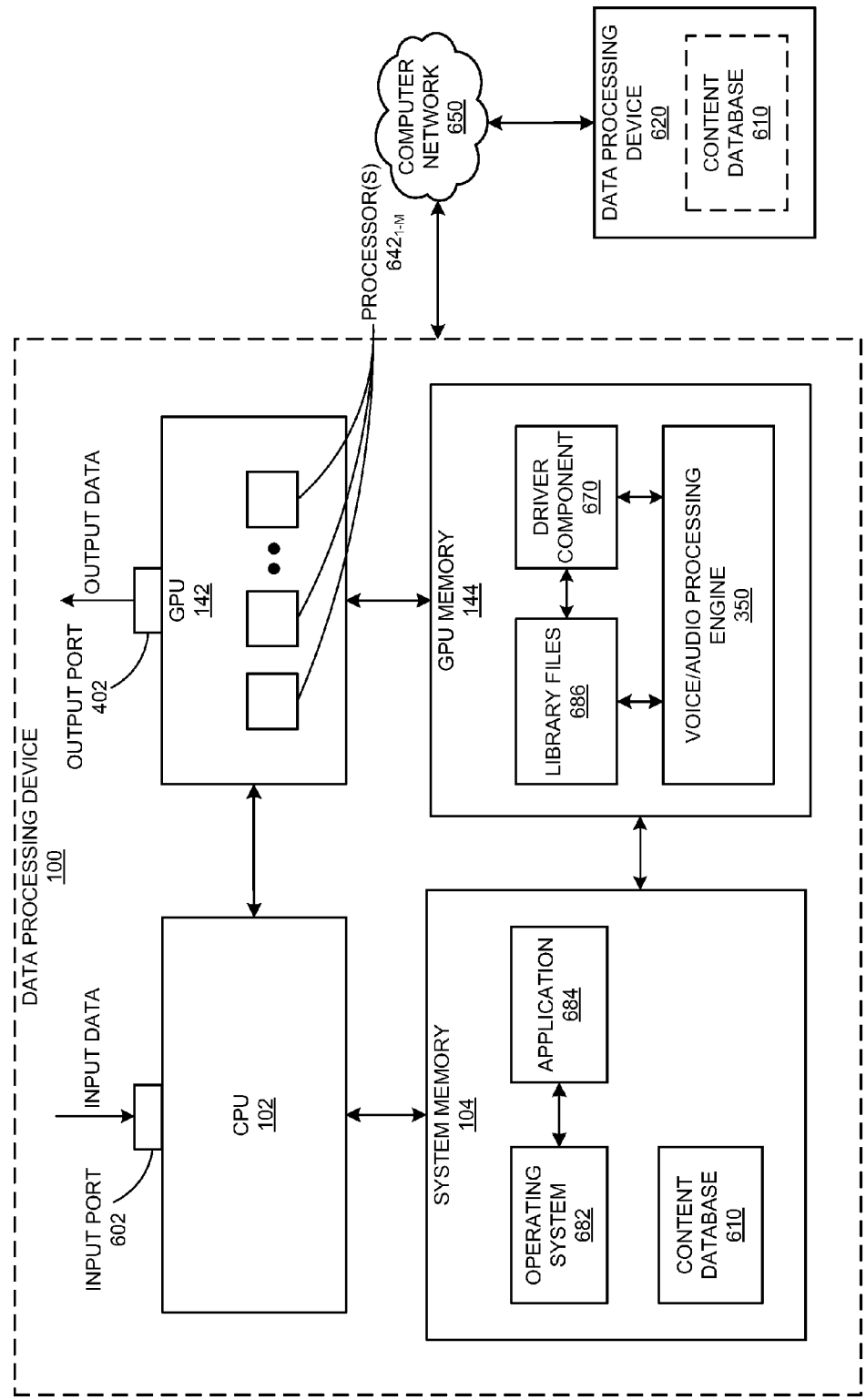
FIG. 6 is a schematic view of an example implementation of the data processing device of FIG. 1 with an output port related to voice/audio being interfaced with the GPU and an input port related to voice/audio being interfaced with a CPU.

It should be noted that voice/audio adapter 400 may not be the sole implementation of GPU 142. In the case of a planar System on a Chip (SoC) implementation (e.g., CPU 102 and GPU 142 may be on a same chip), electrical connections may either be taken out of GPU 142 or taken into GPU 142 through output port 402 or input port 404 (again, the same port may be an I/O port). FIG. 6 shows an example implementation of data processing device 100 with an output port 402 related to voice/audio being interfaced with GPU 142 and an input port 602 related to voice/audio being interfaced with CPU 102. As discussed above, voice/audio processing engine 350 may be implemented in data processing device 100. Said voice/audio processing engine 350 is shown as being stored in GPU memory 144 to be executed through GPU 142. For example, voice/audio processing engine 350 may be implemented with speech recognition algorithms configured to extract contextual interpretation of a voice/audio (e.g., speech) input through input port 602 (e.g., by way of a microphone).

The input voice/audio data may be stored in system memory 104 to be accessed by GPU 142. Alternately, CPU 102 may be configured to load the input voice/audio data onto GPU memory 144 for processing through GPU 142. In an example embodiment, as shown in FIG. 6, GPU 142 may include a number of processors 642$_{1-M}$ configured to operate in parallel with one another to accelerate processing through GPU 142. It should be noted that the parallel processing configuration is merely shown for example purposes. A single processor implementation of GPU 142 is also within the scope of the exemplary embodiments discussed herein.

Execution of voice/audio processing algorithms through GPU 142 to identify, decode and interpret the voice/audio input data may be sped up through the number of processors 642$_{1-M}$ (e.g., implemented based on nVIDIA®'s Compute Unified Device Architecture (CUDA™) platform and programming model). The voice/audio input discussed above may be decoded into text or machine-readable format, following which contextual interpretation may be performed through GPU 142 based on a content database 610 (e.g., a database of word meaning(s) in one or more languages, contextual information, search results) stored internally in data processing device 100 (e.g., in system memory 104 or GPU memory 144; FIG. 6 shows context database 610 being stored in system memory 104) or external thereto. FIG. 6 also hints at the possibility of context database 610 being stored in an external data processing device 620 (e.g., a server) communicatively coupled to data processing device 100 through a computer network 650 (e.g., Internet, Wide Area Network (WAN), Local Area Network (LAN).

In an example scenario, data processing device 100 may be a Global Positioning System (GPS) device located in a car. A user 150 (see FIG. 1) of data processing device 100 may be driving the car and utilizing data processing device 100 for obtaining driving directions. User 150 may input a current location of the car through input port 602 of data processing device 100 and a target destination. Data processing device 100 may execute voice/audio processing engine 350 to extract contextual information from the input and provide for voice-based driving directions (e.g., through a speaker coupled to output port 402). Alternately, user 150 may query (e.g., "Where is the closest Italian restaurant?") data processing device 100 to trigger processing through voice/audio processing engine 350; Voice/audio processing engine 350 may leverage content database 610 (or, an external database) to obtain a result associated with the query. In case of a new query requiring the utilization of the external database, the result thereof may be stored in content database 610 for future use.

The algorithms implemented in voice/audio processing engine 350 may consider information such as a regional factor (e.g., a location and a local language) of user 150, age of user 150 and gender of user 150 to provide for user-specific results. As the aforementioned information may add complexity to the voice/audio processing, the number of parallel processors 642$_{1-M}$ may enable efficient execution through voice/audio processing engine 350. The dedicated voice/audio processing through GPU 142 may free CPU 102 for non-voice/audio related processing.

In one or more embodiments, voice/audio processing engine 350 may be implemented with algorithms to modulate voice/audio input into a standard format for processing therethrough. In one or more embodiments, voice/audio processing engine 350 may also be implemented with algorithms to detect accent (e.g., of user 150) through the voice/audio input and perform appropriate processing thereon. In the car scenario discussed above, voice/audio processing engine 350 may leverage CPU 102 to extract information from external data processing device 620.

As discussed above, in an alternate implementation, GPU 142 may be provided with input port 404 (e.g., by way of voice/audio adapter 400) configured to receive an input (e.g., audio, non-audio) to be processed through voice/audio processing engine 350. Here, input data may be directly stored in GPU memory 144 for processing through GPU 142. The output of processing may be transmitted to a device coupled to an output port (not shown) interfaced with CPU 102. In yet another alternate implementation, GPU 142 may be interfaced with both input port 404 and output port 402. It should be noted that graphics card 200 may be provided with the voice/audio processing capability discussed with reference to voice/audio adapter 400. In one example implementation thereof, voice/audio processing performed through voice/audio processing engine 350 of GPU 142 of graphics card 200 may be combined with display data processed (e.g., in a separate engine) through GPU 142 to have an output thereof rendered on display unit 120 and a pair of speakers. The separate processing of voice/audio and display data through GPU 142 may increase efficiency of processing through GPU 142.

In one or more embodiments, definitions and/or configurations of input/output devices supported through GPU 142 may be provided in a driver component associated with GPU 142 and/or input/output devices. FIG. 6 shows one such driver component 670 being stored in GPU memory 144. It is obvious that the aforementioned driver component 670 may be available in system memory 104 (e.g., through a download from the Internet) to be later loaded onto GPU memory 144. Further, driver component 670 may be packaged with an operating system 682 executing on data processing device 100 and/or an application 684 (e.g., a voice/audio application) executing on data processing device 100. FIG. 6 shows operating system 682 and application 684 being stored in system memory 104. It should be noted that GPU memory 144 may also include the appropriate library files (e.g., library files 686) for compatibility with multiple operating system environments. Alternately, the aforementioned library files 686 may be stored in system memory 104 to later be transferred to GPU memory 144.

In addition, instructions associated with driver component 670 may be embodied in a non-transitory medium (e.g., a Compact Disc (CD), a Digital Video Disc (DVD), a Blu-ray Disc®, a hard drive) readable through data processing device 100. In one or more embodiments, voice/audio communication through output port 402 and/or input port 404 of voice/audio adapter 400 may be based on existing protocols or specific implementations thereof. Exemplary embodiments enable utilization of GPU 142/voice/audio adapter 400 as a self-contained voice/audio processing device; the applications thereof may range from utilizing GPU 142 completely for voice/audio recording to executing more complicated voice/audio algorithms.

Figure 7:
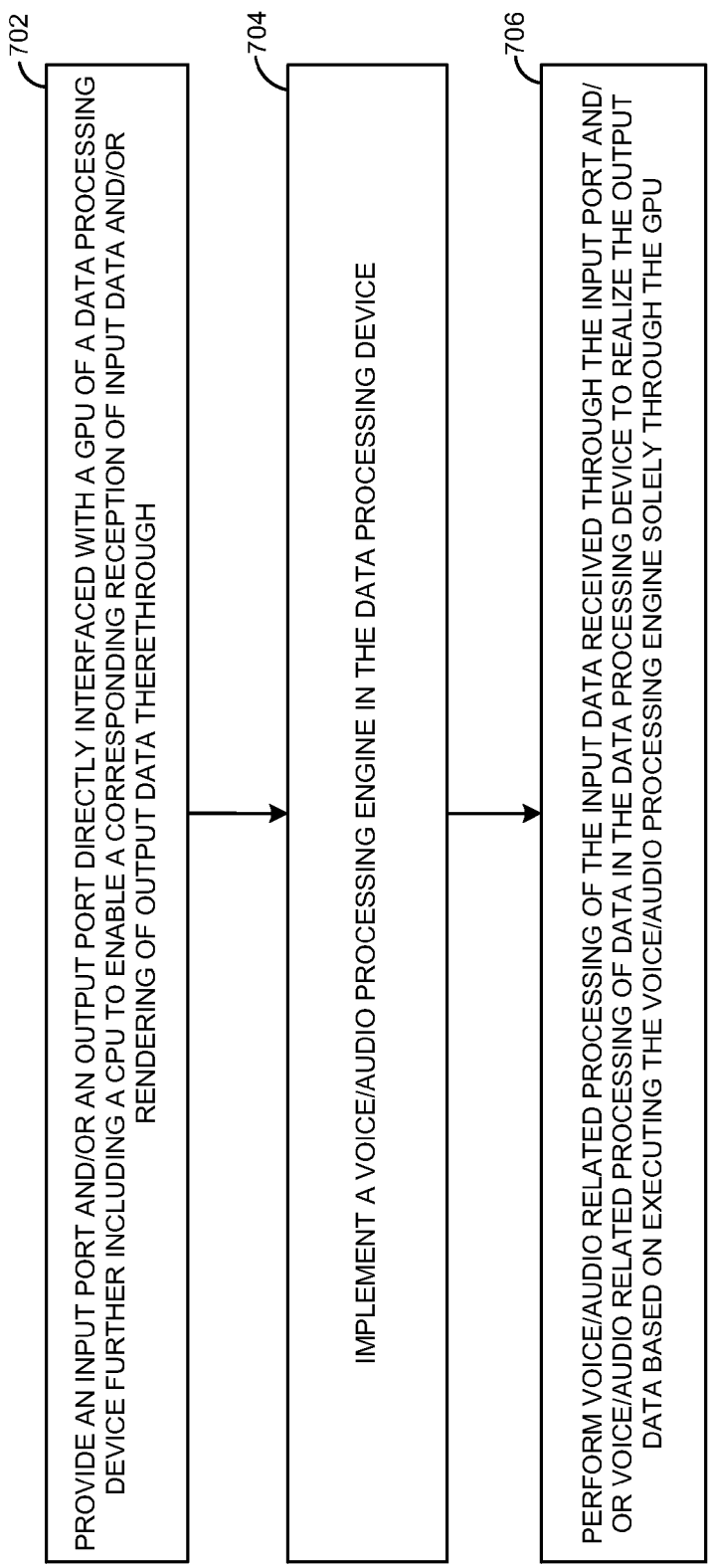
FIG. 7 is a process flow diagram detailing the operations involved in realizing dedicated voice/audio processing through a GPU of the data processing device of FIG. 1, according to one or more embodiments.

FIG. 7 shows a process flow diagram detailing the operations involved in realizing dedicated voice/audio processing through GPU 142 of data processing device 100, according to one or more embodiments. In one or more embodiments, operation 702 may involve providing input port 404 and/or output port 402 directly interfaced with GPU 142 to enable a corresponding reception of input data and/or rendering of output data therethrough. In one or more embodiments, operation 704 may involve implementing voice/audio processing engine 350 in data processing device 100. In one or more embodiments, operation 706 may then involve performing voice/audio related processing of the input data received through input port 404 and/or voice/audio related processing of data in data processing device 100 to realize the output data based on executing voice/audio processing engine 350 solely through GPU 142.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., a system including data processing device 100), and may be performed in any order (e.g., including using means for achieving the various operations). Accordingly, the specification and drawings are to be regarded in an illustrative rather than a restrictive sense.

What is claimed is:

1. A method comprising:
   receiving input audio data by a Graphics Processing Unit (GPU) of a data processing device from a Central Processing Unit (CPU) of the data processing device;
   implementing by the GPU a voice/audio processing engine stored in a memory of the GPU in the data processing device, the voice/audio processing engine including a plurality of processing algorithms;
   decoding, by the voice/audio processing engine of the GPU, the input audio data into a text or machine-readable format;
   performing, by the voice/audio processing engine of the GPU, a contextual interpretation of the decoded input audio data, utilizing a content database stored in the memory of the GPU containing word meanings, contextual information, and search results;
   processing, by another processing engine of the GPU separate from the voice/audio processing engine, display data associated with the input audio data; and
   combining results of the contextual interpretation of the decoded input audio data with the processed display data.

2. The method of claim 1, comprising providing the GPU as part of at least one of a voice/audio adapter and a graphics card configured to be received in an expansion port on a motherboard of the data processing device, the at least one of the voice/audio adapter and the graphics card comprising the at least one of: the input port and the output port directly interfaced with the GPU.

3. The method of claim 1, further comprising storing the input audio data at least one of: in a system memory associated with the CPU to be accessed by the GPU and in a memory associated with the GPU.

4. The method of claim 1, further comprising at least one of:
   providing a plurality of processors configured to operate in parallel with one another as the GPU;
   providing a driver component associated with at least one of the GPU, an input device to be interfaced with the input port and an output device to be interfaced with the output port at least one of: in a system memory associated with the CPU, in a memory associated with the GPU, packaged with an operating system executing on the data processing device and packaged with an application executing on the data processing device; and
   providing library files in at least one of: the system memory associated with the CPU and the memory associated with the GPU to render the voice/audio related processing through the data processing device compatible with a plurality of operating system environments.

5. The method of claim 1, further comprising: leveraging, through at least one of the GPU and the CPU, data from a content database stored in at least one of: the data processing device and a device external to the data processing device during the voice/audio related processing; and modulating, through the voice/audio processing engine, the input audio data into a standard format for further processing therethrough.

6. The method of claim 1, further comprising at least one of:
   providing the input audio data to the input port as one of: voice/audio data and non-voice/audio data; and generating, through the voice/data processing engine, the output data as the one of: the voice/audio data and the non-voice/audio data.

7. A data processing device comprising:
   a Graphics Processing Unit (GPU) of the data processing device for receiving input audio data from a Central Processing Unit (CPU) of the data processing device;
   wherein the GPU implements a voice/audio processing engine stored in a memory of the GPU in the data processing device, the voice/audio processing engine including a plurality of processing algorithms;
   wherein the voice/audio processing engine of the GPU decodes the input audio data into a text or machine-readable format;
   wherein the voice/audio processing engine of the GPU performs a contextual interpretation of the decoded input audio data, utilizing a content database stored in the memory of the GPU containing word meanings, contextual information, and search results;
   wherein another processing engine of the GPU separate from the voice/audio processing engine processes display data associated with the input audio data;
   wherein the GPU combines results of the contextual interpretation of the decoded input audio data with the processed display data.

8. The data processing device of claim 7, wherein the GPU is part of at least one of a voice/audio adapter and a graphics card configured to be received in an expansion port on a motherboard of the data processing device, the at least one of the voice/audio adapter and the graphics card comprising the at least one of: the input port and the output port directly interfaced with the GPU.

9. The data processing device of claim 7, wherein the input audio data is stored at least one of: in the system memory to be accessed by the GPU and in the GPU memory.

10. The data processing device of claim 7, wherein at least one of: the GPU further comprises a plurality of processors configured to operate in parallel with one another, the data processing device further comprises a driver component associated with at least one of the GPU, an input device to be interfaced with the input port and an output device to be interfaced with the output port provided at least one of: in the system memory, in the GPU memory, packaged with an operating system executing on the data processing device and packaged with an application executing on the data processing device, and at least one of: the system memory and the GPU memory comprises library files to render the voice/audio related processing through the data processing device compatible with a plurality of operating system environments.

11. The data processing device of claim 7, wherein, at least one of the GPU and the CPU is configured to leverage data from a content database stored in at least one of: the data processing device and a device external to the data processing device during the voice/audio related processing, and the voice/audio processing engine is configured to modulate the input audio data into a standard format for further processing therethrough.

12. The data processing device of claim 7, wherein at least one of: the input audio data is provided to the input port as one of: voice/audio data and non-voice/audio data, and the voice/data processing engine is configured to generate the output data as the one of: the voice/audio data and the non-voice/audio data.

13. A non-transitory medium, readable through a data processing device and including instructions embodied therein that are executable through the data processing device, comprising: instructions for:
receiving input audio data by a Graphics Processing Unit (GPU) of the data processing device from a Central Processing Unit (CPU) of the data processing device;
implementing by the GPU a voice/audio processing engine stored in a memory of the GPU in the data processing device, the voice/audio processing engine including a plurality of processing algorithms;
decoding, by the voice/audio processing engine of the GPU, the input audio data into a text or machine-readable format;
performing, by the voice/audio processing engine of the GPU, a contextual interpretation of the decoded input audio data, utilizing a content database stored in the memory of the GPU containing word meanings, contextual information, and search results;
processing, by another processing engine of the GPU separate from the voice/audio processing engine, display data associated with the input audio data; and
combining results of the contextual interpretation of the decoded input audio data with the processed display data.

14. The non-transitory medium of claim 13, comprising instructions compatible with the GPU being part of at least one of a voice/audio adapter and a graphics card configured to be received in an expansion port on a motherboard of the data processing device, the at least one of the voice/audio adapter and the graphics card comprising the at least one of: the input port and the output port directly interfaced with the GPU.

15. The non-transitory medium of claim 13, further comprising instructions to store the input audio data at least one of: in a system memory associated with the CPU to be accessed by the GPU and in a memory associated with the GPU.

16. The non-transitory medium of claim 13, further comprising at least one of: instructions compatible with a plurality of processors configured to operate in parallel with one another provided as the GPU; instructions to leverage, through at least one of the GPU and the CPU, data from a content database stored in at least one of: the data processing device and a device external to the data processing device during the voice/audio related processing; and instructions to modulate, through the voice/audio processing engine, the input audio data into a standard format for further processing therethrough.

17. The non-transitory medium of claim 13, further comprising at least one of: instructions to provide the input audio data to the input port as one of: voice/audio data and non-voice/audio data; and instructions to generate, through the voice/data processing engine, the output data as the one of: the voice/audio data and the non-voice/audio data.

* * * * *